US012387525B2

(12) United States Patent
Sun et al.

(10) Patent No.: US 12,387,525 B2
(45) Date of Patent: Aug. 12, 2025

(54) BIOLOGICAL INFORMATION RECOGNITION MODULE AND ELECTRONIC DEVICE

(71) Applicant: TIANJIN JHOV TECHNOLOGY CO., LTD., Tianjin (CN)

(72) Inventors: Jiancheng Sun, Beijing (CN); Haisheng Wang, Beijing (CN); Ying Bi, Beijing (CN)

(73) Assignee: TIANJIN JHOV TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 18/681,868

(22) PCT Filed: Aug. 23, 2022

(86) PCT No.: PCT/CN2022/114273
§ 371 (c)(1),
(2) Date: Feb. 7, 2024

(87) PCT Pub. No.: WO2023/025152
PCT Pub. Date: Mar. 2, 2023

(65) Prior Publication Data
US 2025/0005958 A1     Jan. 2, 2025

(30) Foreign Application Priority Data

Aug. 23, 2021  (CN) .......................... 202110970567.1
Aug. 23, 2021  (CN) .......................... 202121992540.4

(51) Int. Cl.
G06V 40/13      (2022.01)
G06V 10/75      (2022.01)
G06F 3/041      (2006.01)

(52) U.S. Cl.
CPC ........ *G06V 40/1318* (2022.01); *G06V 10/751* (2022.01); *G06F 3/0412* (2013.01)

(58) Field of Classification Search
None
See application file for complete search history.

(56) References Cited

U.S. PATENT DOCUMENTS

2012/0313913 A1\* 12/2012 Shiraki ................. G06F 3/0412
                                                        345/207
2017/0220840 A1\* 8/2017 Wickboldt ......... G06V 40/1335
2021/0020710 A1\* 1/2021 Park .................... H10K 59/8792

FOREIGN PATENT DOCUMENTS

CN    111095285 A    5/2020
CN    111108511 A    5/2020
(Continued)

*Primary Examiner* — Joseph R Haley
(74) *Attorney, Agent, or Firm* — Bayramoglu Law Offices LLC

(57) ABSTRACT

A biological information recognition module and an electronic device are provided. The biological information recognition module includes an optical path guide layer and an optical sensor, wherein the optical path guide layer includes a plurality of optical channels, and the optical sensor includes a plurality of photosensitive pixel units, and at least one vacant unit arranged among the plurality of photosensitive pixel units; and light beams carrying biological information above the vacant unit are received by at least one photosensitive pixel unit via the optical channels. The electronic device includes a display screen, and a biological information recognition module arranged under the display screen.

19 Claims, 10 Drawing Sheets

(56) References Cited

FOREIGN PATENT DOCUMENTS

| CN | 210488569 U | 5/2020 |
|---|---|---|
| CN | 111507229 A | 8/2020 |
| CN | 211375615 U | 8/2020 |
| CN | 111788577 A | 10/2020 |
| CN | 211742124 U | 10/2020 |
| CN | 111881873 A | 11/2020 |
| CN | 113780103 A | 12/2021 |
| CN | 216161103 U | 4/2022 |
| CN | 216161104 U | 4/2022 |
| WO | 2021082680 A1 | 5/2021 |

* cited by examiner

BIOLOGICAL INFORMATION RECOGNITION MODULE AND ELECTRONIC DEVICE

CROSS REFERENCE TO RELATED APPLICATIONS

The present disclosure is the national phase entry of International Application No. PCT/CN2022/114273, filed on Aug. 23, 2022, which claims priority to the Chinese patent application with the filing No. 202110970567.1 filed with the China National Intellectual Property Administration on Aug. 23, 2021, and entitled "Biological Information Recognition Module and Electronic Device", and priority to the Chinese patent application with the filing No. 202121992540.4 filed with the China National Intellectual Property Administration on Aug. 23, 2021, and entitled "Biological Information Identification Module and Electronic Device" and all the contents of these applications are incorporated herein by reference in their entirety.

TECHNICAL FIELD

The present disclosure relates to the technical field of electronics, and specifically to a biological information recognition module (i.e., biometric information recognition module) and an electronic device.

BACKGROUND ART

With high development of intelligence of terminal electronic devices, human body biological information recognition is used increasingly widely in electronic devices in depth, and has been gradually developed from previous unlocking for waking up electronic devices, by using the biological information recognition, to identity recognition, identity authentication and the like of various software programs. Moreover, with the increasingly wide application of the biological information recognition to the electronic devices, accuracy of the biological information recognition as well as recognition capability and recognition speed for fingerprint information of the electronic devices, especially display-type electronic devices is improved.

In the biological information recognition technologies of related art, in the biological information recognition applied to the electronic devices such as mobile phones and tablet computers, fingerprint recognition is one type of biological information recognition, and a recognition method thereof is mainly optical fingerprint recognition, in which the function of recording fingerprints or recognizing specific fingerprints is achieved by irradiating the fingerprints by a light source of a display panel, reflecting the light, and receiving, recording or analyzing, by an optical detector, fingerprint-reflected light carrying specific biological information. At present, with the demand for miniaturization of the electronic devices dominated by handheld mobile terminals such as mobile phones and tablet computers, increasingly higher requirements are also put on thinning and miniaturization of a fingerprint recognition module disposed inside the electronic devices.

Generally, the electronic devices such as mobile phones and tablet computers realize specific fingerprint recognition mainly by receiving, recording or analyzing the fingerprint-reflected light carrying the specific biological information by a fingerprint recognition module applied under a display screen. Due to the miniaturization demand for the electronic devices, the optical detector for the fingerprint recognition also needs to be continuously reduced in volume. In order to ensure the accuracy of biological information recognition, a collection area for the biological information on the display screen should be ensured within a relatively small area range at least. But it is difficult to further structurally reduce the fingerprint recognition module, which greatly affects the miniaturization of the electronic devices.

SUMMARY

Embodiments of the present disclosure provide a biological information recognition module and an electronic device, wherein a structural dimension of the biological information recognition module can be reduced, so that the module is structurally miniaturized.

Embodiments of the present disclosure provide a biological information recognition module. The biological information recognition module may include an optical path guide layer and an optical sensor; the optical path guide layer may include a plurality of optical channels, the optical sensor may include a plurality of photosensitive pixel units and at least one vacant unit provided among the plurality of photosensitive pixel units; and light beams carrying biological information above the vacant unit may be received by at least one of the photosensitive pixel units via the optical channels.

Optionally, the optical channels may include inclined optical channels, and the inclined optical channels have included angles with a straight line perpendicular to a surface of the optical sensor; and the light beams carrying the biological information above the vacant unit are received by the photosensitive pixel units via the inclined optical channels.

Optionally, the optical sensor may include a plurality of vacant units, and the plurality of vacant units are discretely distributed among the plurality of photosensitive pixel units.

Optionally, a shape of the vacant unit may be the same as that of the photosensitive pixel unit; and/or, an area of the vacant unit may be the same as that of the photosensitive pixel unit.

Optionally, the number of the vacant units may be smaller than that of the photosensitive pixel units.

Optionally, a plurality of photosensitive pixel units and at least one vacant unit may form a photosensitive pixel unit group; and the optical channels corresponding to at least a part of the photosensitive pixel units in the photosensitive pixel unit group may be the inclined optical channels.

Optionally, the number of the vacant units and the number of the photosensitive pixel units in each photosensitive pixel unit group on the optical sensor may be the same, and arrangement rules of the vacant units and the photosensitive pixel units in each photosensitive pixel unit group may be the same.

Optionally, the optical channel corresponding to at least one of the photosensitive pixel units, which is centrally symmetrical to the vacant unit, in the photosensitive pixel unit group, may be the inclined optical channel.

Optionally, a center of the photosensitive pixel unit group may be the vacant unit.

Optionally, the optical channels corresponding to at least two photosensitive pixel units which are symmetrical to each other with the vacant unit as a center may intersect above the center.

Optionally, the photosensitive pixel unit group may include a plurality of vacant units, and the photosensitive pixel units are provided between two of the vacant units.

Optionally, light beams above the vacant unit may be incident to at least one photosensitive pixel unit adjacent to the vacant unit through the inclined optical channel.

Optionally, within the photosensitive pixel unit group, degrees of the included angles of the optical channels corresponding to the plurality of photosensitive pixel units equally spaced from the vacant unit may be the same.

Optionally, the plurality of photosensitive pixel units and the at least one vacant unit forming the photosensitive pixel unit group may be arranged and combined in an M*N form, where M is an integer greater than or equal to 1, and N is an integer greater than or equal to 2.

Optionally, a total area of the plurality of photosensitive pixel units in the photosensitive pixel unit group may be greater than or equal to a total area of the at least one vacant unit.

Optionally, the vacant unit may include a first reserved area for arranging circuit signal lines.

Optionally, the vacant unit further may include a second reserved area for providing circuit elements.

Optionally, an insulation layer and an electrically conductive layer further may be provided in sequence on a back side of the optical sensor, via holes are provided running through the optical sensor and the insulation layer and communicating with the electrically conductive layer, and two vacant units spaced apart from each other communicate with the electrically conductive layer through the via holes.

In another aspect of the embodiments of the present disclosure, an electronic device is provided, wherein the electronic device may include a display screen, and the biological information recognition module according to any one of the preceding arranged under the display screen.

Optionally, a biological information recognition region may be provided on the display screen, and light beams from the biological information recognition region above the vacant unit are received by the corresponding photosensitive pixel units through the optical channels.

Beneficial effects of the present disclosure at least may include the following.

The biological information recognition module provided in the present disclosure includes the optical path guide layer and the optical sensor; the optical path guide layer includes a plurality of optical channels, the optical sensor includes a plurality of photosensitive pixel units and at least one vacant unit provided among the plurality of photosensitive pixel units; and the light beams carrying the biological information above the vacant unit are received by at least one photosensitive pixel unit via the optical channels. When the biological information recognition module is in use, the light beams carrying the biological information may be transmitted to the optical sensor through the plurality of optical channels, so as to be received and recognized by the photosensitive pixel units of the optical sensor. Meanwhile, the light beams carrying the biological information located above the vacant unit may be received by at least one photosensitive pixel unit via the optical channels, and normal transmission thereof is not affected. In the present disclosure, by providing the vacant unit among the plurality of photosensitive pixel units, and making the light beams carrying the biological information above the vacant unit received by at least one photosensitive pixel unit after passing through the optical channels, the photosensitive pixel units, except the vacant unit, can completely receive the light beams carrying the biological information within a range of collection area for the biological information on the display screen, and capability of the photosensitive pixel units of receiving optical signals is improved, so that the biological information recognition module can receive more optical signals carrying the biological information, and further obtain more biological information, thereby facilitating the accuracy of the biological information recognition. In addition, without increasing the collection area for the biological information on the display screen, the present disclosure further may improve the effective utilization rate of the area of the photosensitive region of the optical sensor, and reduce the area of the photosensitive region of the optical sensor, so that the volume of the optical sensor is reduced, thereby saving more internal space for electronic devices adopting the biological information recognition module provided in the present disclosure, and simultaneously reducing the cost of the biological information recognition module.

BRIEF DESCRIPTION OF DRAWINGS

In order to more clearly describe technical solutions of embodiments of the present disclosure, drawings that need to be used in the embodiments of the present disclosure will be briefly introduced below. It should be understood that the drawings only show some of the embodiments of the present disclosure, and therefore should not be regarded as limitation to the scope. Those ordinarily skilled in the art still could obtain other relevant drawings according to these drawings without using any inventive efforts.

Figure 1:
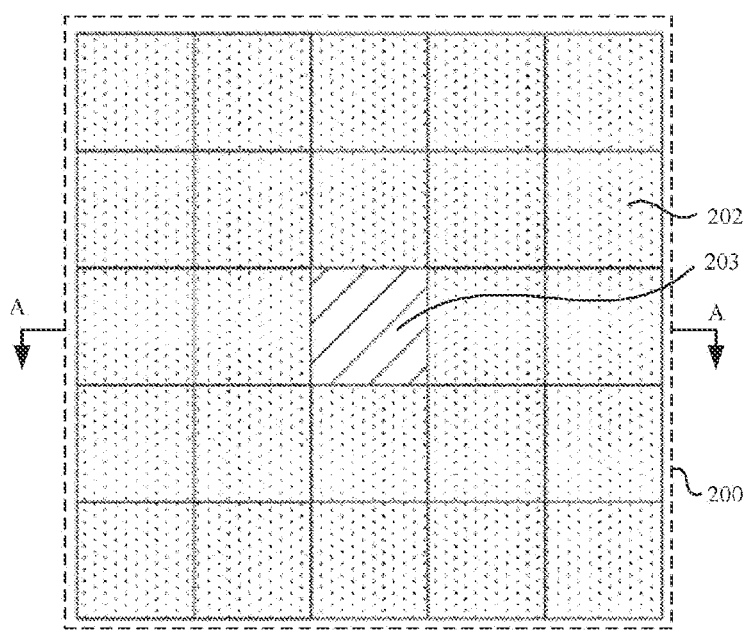
FIG. 1 is a first structural schematic diagram of a biological information recognition module provided in embodiments of the present disclosure.

Reference signs: 100—optical path guide layer; 101—optical channel; 102—inclined optical channel: $\theta$, $\theta_1$, $\theta_2$, $\theta'_1$, $\theta'_2$, $\theta_3$, $\theta'_3$—included angle; 200—optical sensor; 201—photosensitive pixel unit group; 202, 202a, 202b, 202c, 202d, 202e, 202f, 202g, 202h, 202i, 202j, 202k-photosensitive pixel unit; 203, 203A, 203B, 203C—vacant unit; 300—display screen; 301—biological information recognition region.

DETAILED DESCRIPTION OF EMBODIMENTS

The technical solutions in the embodiments of the present disclosure will be described clearly and completely below with reference to drawings in the embodiments of the present disclosure.

In the description of the present disclosure, it should be noted that orientation or positional relationships indicated by terms such as "inner" and "outer" are based on orientation or positional relationships as shown in the drawings, or orientation or positional relationships of a product of the present disclosure conventionally placed in use, merely for facilitating the description of the present disclosure and simplifying the description, rather than indicating or suggesting that devices or elements referred to have to be in the specific orientation or configured and operated in a specific orientation, therefore, they should not be construed as limitation to the present disclosure. Besides, terms such as "first" and "second" are merely used to distinguish the description, but should not be construed as indicating or suggesting importance in relativity.

It further needs to be indicated that unless otherwise specified and defined explicitly, terms "provide" and "connect" should be construed in a broad sense. For example, it may be a fixed connection, also may be a detachable connection, or an integrated connection; it may be a direct connection, and also may be an indirect connection through an intermediary or internal communication between two elements. Those ordinarily skilled in the art could understand specific meanings of the above terms in the present disclosure in accordance with specific circumstances.

Biological recognition technologies have been widely applied to various terminal devices or electronic apparatuses. The biological characteristic recognition technology includes, but is not limited to, fingerprint recognition, palm print recognition, vein recognition, iris recognition, face recognition, living body recognition, anti-counterfeit recognition and other technologies. In the above, the fingerprint recognition generally includes optical fingerprint recognition, capacitive fingerprint recognition and ultrasonic fingerprint recognition. With the rise of full-screen technology, a fingerprint recognition module may be disposed in a partial or whole region under a display screen, so as to form under-display optical fingerprint recognition. Alternatively, an optical fingerprint recognition module also may be partially or completely integrated into a display screen of an electronic device, so as to form in-display optical fingerprint recognition. The display screen may be an organic light emitting diode (OLED) display screen or a liquid crystal display (LCD) screen or the like. A fingerprint recognition method generally includes fingerprint image acquisition, preprocessing, feature extraction, feature matching and other steps. Some or all of the above steps may be realized by a conventional computer vision (CV) algorithm, or also may be realized by a deep learning algorithm based on artificial intelligence (AI). The fingerprint recognition technology may be applied to portable or mobile terminals such as smart phones, tablet computers, and gaming devices, and other electronic devices such as smart door locks, automobiles, and bank automatic tellers, for fingerprint unlocking, fingerprint payment, fingerprint attendance, identity authentication and the like.

A biological information recognition module applied under a display screen generally needs to realize confirmation and recognition of an individual to which specific biological information belongs, by receiving, recording or analyzing reflected light carrying the specific biological information. For the display screen provided on the biological information recognition module, firstly it needs to realize a desired display function, and then a collection area that can be obtained by dividing for under-display biological information recognition is quite limited. Moreover, for extraction of biological information, sufficient light beams carrying the biological information in turn are demanded as the basis to obtain accurate recognition information. On this basis, when the module can obtain more light beams carrying the biological information, the recognition accuracy, anti-interference capability, and counterfeiting recognition ability thereof can be correspondingly improved. Therefore, it is an important problem to be addressed and improved urgently in specific application of the biological information recognition module that how to sufficiently acquire reflected light beams carrying the specific biological information within such limited collection area for the biological information and process these reflected light beams, to obtain as much specific biological information as possible from the reflected light beams, so as to effectively improve the accuracy of confirming and recognizing a person to whom the biological characteristic information belongs.

Certainly, the biological information identification module may not need to be integrated under the display screen of the display device. In other feasible application scenarios, the biological information module may exist as a separate module for biological information recognition. For example, a transparent protection glass plate or protection film layer may be provided on the biological information module, so that light beams carrying biological information are incident to the biological information recognition module through the protection glass plate, and are further recognized by the biological information recognition module.

Based on this, embodiments of the present disclosure provide a biological information recognition module. The biological information recognition module may be a fingerprint recognition module. For ease of understanding, fingerprint recognition which is relatively common in real life is mainly taken as an example for illustration. With specific reference to FIG. 1 and FIG. 2, the biological information recognition module may include an optical path guide layer 100 and an optical sensor 200. The optical path guide layer 100 may include a plurality of optical channels 101. The optical sensor 200 may include a plurality of photosensitive pixel units 202 and at least one vacant unit 203 provided among the plurality of photosensitive pixel units 202. Light beams carrying biological information above the vacant unit 203 may be received by at least one photosensitive pixel unit 202 via the optical channels 101.

Figure 2:
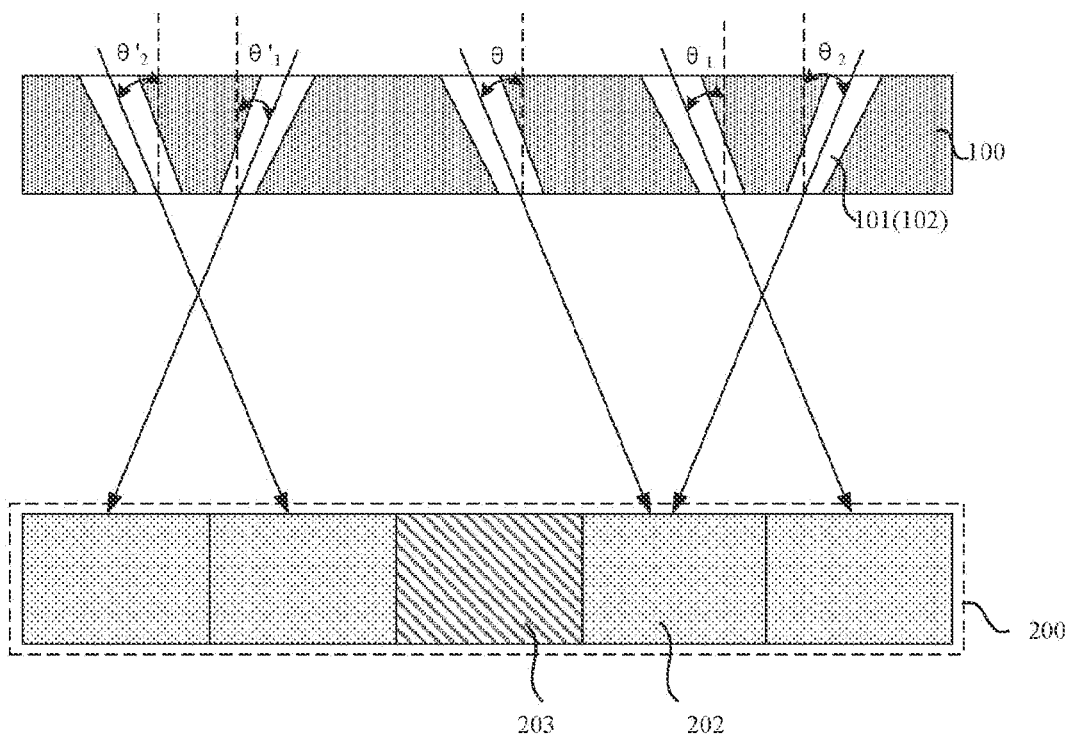
FIG. 2 is a sectional view along A-A in FIG. 1.

FIG. 2 is a first structural schematic diagram of the biological information recognition module provided in embodiments of the present disclosure. As shown in FIG. 2, the optical path guide layer 100 and the optical sensor 200 may be provided in sequence in a transmission direction of the light beams carrying the biological information. The optical path guide layer 100 may include a plurality of optical channels 101. Each optical channel 101 can allow the light beams carrying the biological information to pass therethrough. The light beams carrying the biological information are incident to the optical sensor 200 below via the optical channels 101 of the optical path guide layer 100 above, and are received by at least one photosensitive pixel unit 202 on the optical sensor 200. In the above, the optical channels 101 are configured to transmit the light beams carrying the biological information thereon to the corresponding photosensitive pixel units 202. In the embodiments of the present disclosure, the optical channels 101 are not specifically limited in the shape, size and so on, as long as the optical channels 101 can allow as many light beams carrying the biological information as possible to pass through the optical channels and be successfully received by the optical sensor 200. For example, a longitudinal section of each optical channel 101 may be a quadrangle, a trapezoid or the like, and a cross section of each optical channel 101 may be circular, square or the like.

As shown in FIG. 1, the optical sensor 200 may include a plurality of photosensitive pixel units 202, and further may include at least one vacant unit 203. The vacant unit 203 refers to a unit obtained by not providing the photosensitive pixel unit 202 for receiving optical signals at a position of the optical sensor 200 to make the position vacant. The vacant unit 203 may be located among the plurality of photosensitive pixel units 202, wherein each photosensitive pixel unit 202 may receive the light beams carrying the biological information passing through the optical channels 101, and the light beams carrying the biological information above the vacant unit 203, after passing through the optical channels 101, can be received by at least one photosensitive pixel unit 202 in the plurality of photosensitive pixel units 202. Thus, in cases where the vacant unit 203 is provided, efficient reception of the incident light beams carrying the biological information still can be ensured.

Exemplarily, as shown in FIG. 1, the optical sensor 200 may include one vacant unit 203, and 24 photosensitive pixel units 202. The one vacant unit 203 and the 24 photosensitive pixel units 202 surrounding it may form a 5*5 array structure. The light beams carrying the biological information correspondingly above the vacant unit 203, after passing through the optical channel 101 correspondingly above the vacant unit 203 as shown in FIG. 2, can be received by the photosensitive pixel unit 202 adjacent to the vacant unit 203, so as to perform the biological information recognition. On the optical sensor 200, there may be a plurality of (24) photosensitive pixel units 202 for receiving the light beams carrying the biological information. When a plurality of vacant units 203 are provided among the plurality of photosensitive pixel units 202, or when the light beams correspondingly above one vacant unit 203 cannot be completely received by only one photosensitive pixel unit 202 adjacent to this one vacant unit 203, the light beams carrying the biological information above this one vacant unit 203 also may be correspondingly received by a plurality of photosensitive pixel units 202, thereby ensuring that more light beams carrying the biological information can be received, so as to acquire more biological information, avoid missing the light beams carrying the biological information, and improving the accuracy of the biological information recognition.

It should be noted that, in practical applications, the optical sensor 200 is generally divided into tens of thousands of pixel units, for providing the photosensitive pixel units 202 or the vacant units 203. The drawings in the present disclosure cannot completely show such a large number of units, therefore, a small number of units are exemplarily shown and described herein and in the following drawings. Those skilled in the art should understand that for the optical sensor 200 in practical applications, actual arrangement configurations of the pixel units of the actual optical sensor 200 may be formed by repeat arrangement based on local examples as exemplarily shown and described in the present application.

Besides, as can be seen from FIG. 1 and FIG. 2, in the present embodiment the optical channels 101 and the photosensitive pixel units 202 may be in a one-to-one correspondence. The light beams carrying the biological information above the vacant unit 203, after passing through corresponding optical channel 101, may be received by one photosensitive pixel unit 202 adjacent to this vacant unit 203, but this is not inevitable, while the correspondence between the optical channels 101 and the pixel units on the optical sensor 200 also may be many-to-one or other correspondence, as long as it can make as many light beams carrying the biological information as possible to be received by the photosensitive pixel units 202 on the optical sensor 200 according to the correspondence.

Certainly, FIG. 1 only shows an optional implementation of the embodiments of the present disclosure, and the number of the photosensitive pixel units 202 and the number of the vacant units 203 in the optical sensor 200 as well as combination forms between them are not merely limited to the above implementation of FIG. 1. There are many combination forms of the numbers and arrangement of the vacant units 203 and the photosensitive pixel units 202, but there is at least one vacant unit 203.

Figure 3:
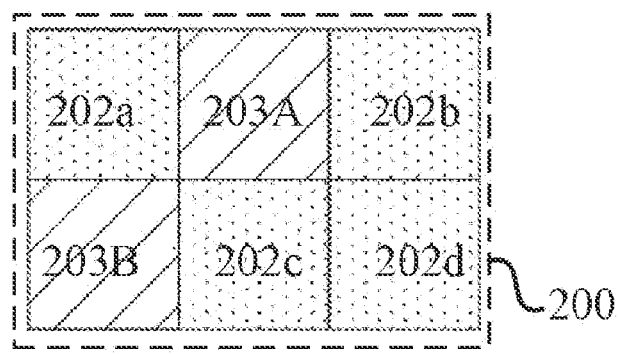
FIG. 3 is a first structural schematic diagram of an optical sensor in a biological information recognition module provided in embodiments of the present disclosure.
Figure 4:
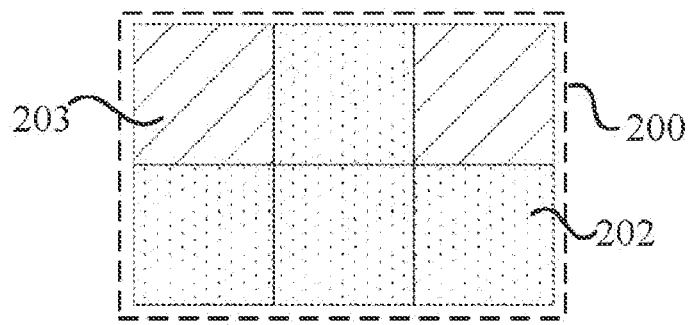
FIG. 4 is a second structural schematic diagram of an optical sensor in a biological information recognition module provided in embodiments of the present disclosure.
Figure 5:
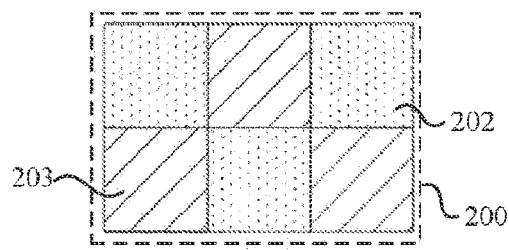
FIG. 5 is a third structural schematic diagram of an optical sensor in a biological information recognition module provided in embodiments of the present disclosure.
Figure 6:
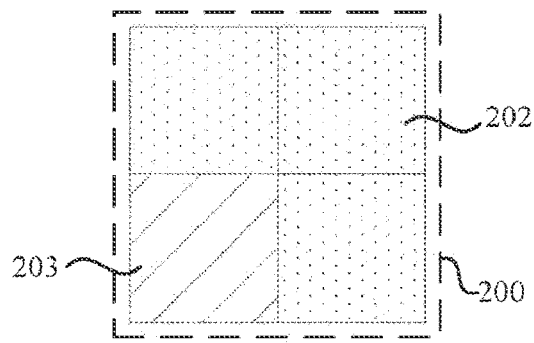
FIG. 6 is a fourth structural schematic diagram of an optical sensor in a biological information recognition module provided in embodiments of the present disclosure.

Exemplarily, the optical sensor 200 further may be as shown in FIG. 3 or FIG. 4. FIG. 3 and FIG. 4 each show a combination form in which two vacant units 203 and four photosensitive pixel units 202 form a 2*3 rectangular array. Moreover, in FIG. 3 and FIG. 4, the two vacant units 203 are also distributed in different forms. In FIG. 3, the two vacant units 203 are arranged in a form of being connected through points of opposite corners. As shown in FIG. 4, the two vacant units 203 are completely separated from each other on two sides by one photosensitive pixel unit 202. For another example, FIG. 5 shows a combination form of a 2*3 rectangular array formed by three vacant units 203 and three photosensitive pixel units 202, and FIG. 6 shows a combination form of a 2*2 square array formed by three vacant units 203 and one photosensitive pixel unit 202. Moreover, as can be seen from FIG. 1 and FIG. 6, FIG. 1 and FIG. 6 each show an arrangement mode of a square array in which horizontal rows and vertical columns formed by the vacant unit 203 and the photosensitive pixel units 202 are in an equal number. FIG. 3 to FIG. 5 each show an arrangement mode of a rectangular array in which horizontal rows and vertical columns formed by the vacant units 203 and the photosensitive pixel units 202 are in unequal numbers. Certainly, the numbers of the vacant units 203 and the photosensitive pixel units 202 arranged also may be in other modes, and the vacant units 203 and the photosensitive pixel units 202 also may be arranged in shapes other than the square in the drawings, which is not redundantly described herein, and those skilled in the art could design specific configuration and arrangement modes according to practical situations.

The biological information recognition module provided in the present disclosure includes the optical path guide layer 100 and the optical sensor 200; the optical path guide layer 100 includes a plurality of optical channels 101, the optical sensor 200 includes a plurality of photosensitive pixel units 202 and at least one vacant unit 203 provided among the plurality of photosensitive pixel units 202; and the light beams carrying the biological information above the vacant unit 203 are received by at least one photosensitive pixel unit 202 via the optical channels 101. When the biological information recognition module is in use, the light beams carrying the biological information may be transmitted to the optical sensor 200 through the plurality of optical channels 101, so as to be received and recognized by the photosensitive pixel units 202 of the optical sensor 200. Meanwhile, the light beams carrying the biological information located above the vacant unit 203 may be received by at least one photosensitive pixel unit 202 via the optical channels 101, and normal transmission thereof is not affected. In the present disclosure, by providing the vacant unit 203 among the plurality of photosensitive pixel units 202, and making the light beams carrying the biological information above the vacant unit 203 received by at least one photosensitive pixel unit 202 after passing through the optical channels 101, the photosensitive pixel units 202, except the vacant unit 203, can completely receive the light beams carrying the biological information within a collection area range for the biological information on a display screen, and capability of the photosensitive pixel units 202 of receiving optical signals is improved, so that the biological information recognition module can receive more optical signals of the light beams carrying the biological information, and further obtain more biological information, thereby facilitating the accuracy of the biological information recognition. In addition, without increasing the collection area for the biological information on the display screen, the present disclosure further may improve the effective utilization rate of the area of the photosensitive region of the optical sensor 200, and reduce the area of the photosensitive region of the optical sensor 200, so that the volume of the optical sensor 200 is reduced, thereby saving more internal space for electronic devices adopting the biological information recognition module provided in the present disclosure, and simultaneously reducing the cost of the biological information recognition module.

Referring to FIG. 2, in an optional implementation of the embodiments of the present disclosure, the optical channels 101 may include inclined optical channels 102, and the inclined optical channels 102 may have included angles θ with a straight line perpendicular to a surface of the optical sensor 200; and the light beams carrying the biological information above the vacant unit 203 may be received by the photosensitive pixel units 202 via the inclined optical channels 102.

The plurality of photosensitive pixel units 202 of the optical sensor 200 may together form the photosensitive region of the optical sensor 200. Since the optical channels 101 include the inclined optical channels 102, by guiding and transmitting the light beams carrying the biological information through the inclined optical channels 102, in cases where the area of the photosensitive region of the optical sensor 200 is unchanged, the light beams carrying the biological information other than from above the photosensitive pixel units 202 can be guided and transmitted to at least one photosensitive pixel unit 202 through the inclined optical channels 102, thus, in cases where the number of the photosensitive pixel units 202 provided is reduced (the area of the photosensitive region is reduced), the light beams carrying the biological information can still be fully and effectively received by the optical sensor 200, thus improving the effective utilization rate of the area of the photosensitive region of the optical sensor 200, reducing the area of the photosensitive region of the optical sensor 200, and thereby reducing the volume of the optical sensor 200.

It should be noted that, a photosensitive receiving surface of the optical sensor 200 also may be set to be of various different surface types as needed, including, but not limited to, a plane surface, a convex cambered surface, a concave cambered surface, an inclined surface and the like. In the embodiments of the present disclosure, the plane surface, a conventional surface type of the optical sensor 200, is taken as an example for description. In the above, the photosensitive receiving surface may be formed by surfaces of a plurality of photosensitive pixel units 202 and the vacant unit 203 of the optical sensor 200 together.

Exemplarily, as shown in FIG. 2, the inclined optical channels 102 and the straight line perpendicular to the surface of the optical sensor 200 may have the included angles θ therebetween, and the included angles θ are between 0° and 60°. Depending on specific setting situations, the included angles θ may be set as 0°, 2°, 5°, 10°, 15°, 35°, 40°, 53°, 60° and so on, which is not enumerated herein. In an optional implementation of the embodiments of the present disclosure, for the plurality of inclined optical channels 102, degrees of the included angles θ of the inclined optical channels 102 may be set to gradually increase from a central inclined optical channel 102 in a direction away from the central inclined optical channel 102, that is, $\theta_1 < \theta_2$, and $\theta'_1 < \theta'_2$. Moreover, taking the central inclined optical channel 102 as a center, the inclined optical channels 102 at two sides may be symmetrically provided, and degrees of the included angles θ of two symmetrical inclined optical channels 102 may be equal, that is, $\theta_1 = \theta'_1$, and $\theta_2 = \theta'_2$ in FIG. 2.

FIG. 1 and FIG. 2 have illustrated an example in which the optical sensor 200 includes one vacant unit 203. In an optional implementation of the embodiments of the present disclosure, as shown in FIG. 8, the optical sensor 200 may include a plurality of vacant units 203, and the plurality of vacant units 203 may be discretely distributed among the plurality of photosensitive pixel units 202.

Figure 8:
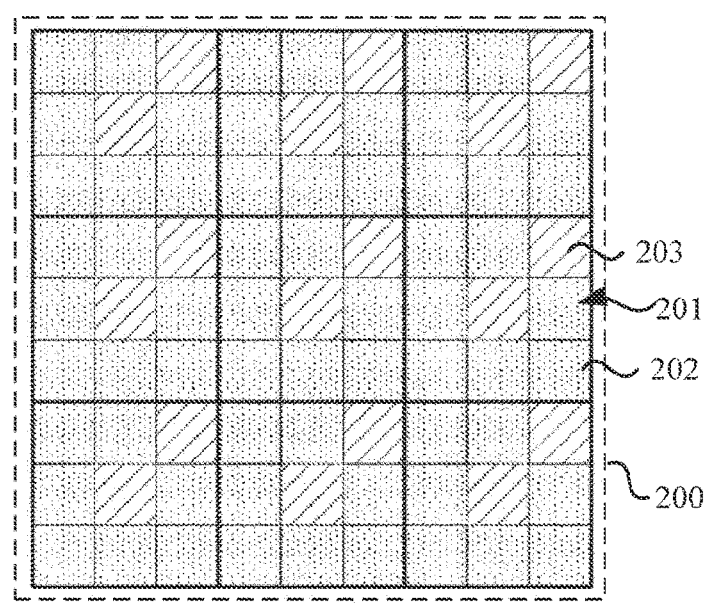
FIG. 8 is a sixth structural schematic diagram of an optical sensor in a biological information recognition module provided in embodiments of the present disclosure.
Figure 13:
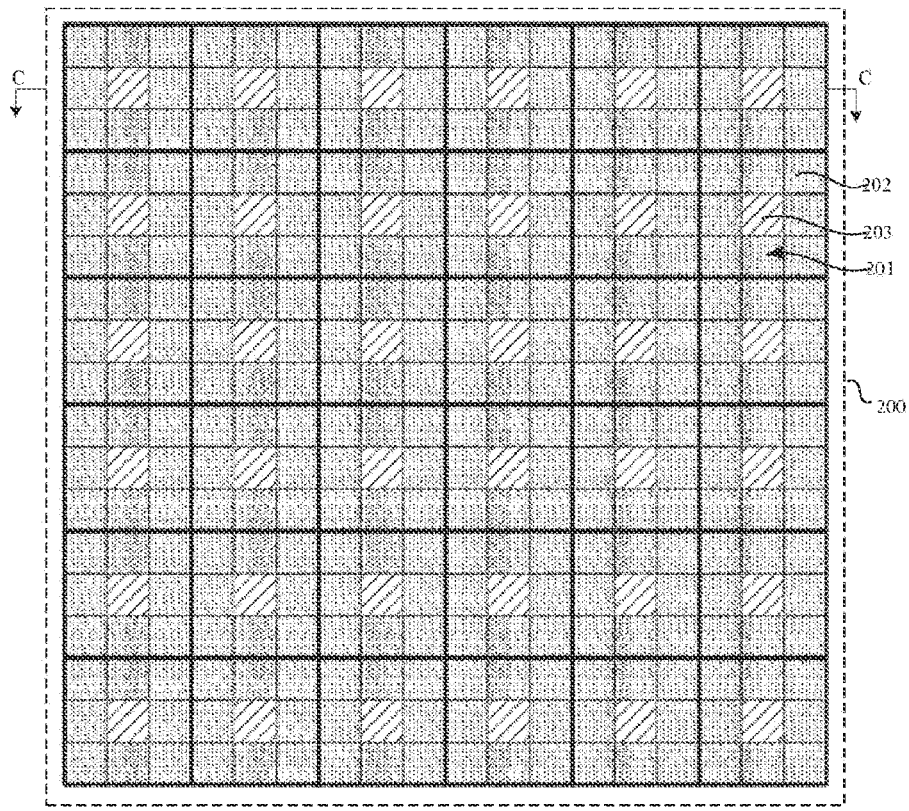
FIG. 13 is an eighth structural schematic diagram of an optical sensor in a biological information recognition module provided in embodiments of the present disclosure.

It should be noted that, when there are a plurality of vacant units 203, the discrete distribution of the plurality of vacant units 203 may include: one case as shown in FIG. 13, in which any two vacant units 203 are completely isolated from each other by a plurality of photosensitive pixel units 202 therebetween and are absolutely not in contact with each other; or another case as shown in FIG. 8, in which when the vacant units 203 and the photosensitive pixel units 202 are all square, two vacant units 203 only have a theoretical connection relationship at corner portions, and are relatively not in contact. In both two cases above, the plurality of vacant units 203 defined in the embodiments of the present disclosure are discretely distributed. The plurality of vacant units 203 need to be separated from each other by the photosensitive pixel units 202. That the plurality of vacant units 203 are not in contact with each other means that there is no surface-to-surface contact between the plurality of vacant units 203, which is to avoid the vacant units 203 connected with each other from forming a large area that does not receive the light beams carrying the biological information, to make the photosensitive pixel units 202 around them fail to completely and accurately receive the light beams carrying the biological information corresponding to the vacant units 203, and to cause loss of the light beams carrying the biological information.

Taking FIG. 3 as an example, four photosensitive pixel units 202, which are a photosensitive pixel unit 202a, a photosensitive pixel unit 202b, a photosensitive pixel unit 202c, and a photosensitive pixel unit 202d respectively, may be provided around a vacant unit 203A, and two photosensitive pixel units 202, which are the photosensitive pixel unit 202a and the photosensitive pixel unit 202c respectively, may be provided around a vacant unit 203B. The vacant unit 203A and the vacant unit 203B may be joined/connected only through diagonal points (points of opposite corners). Connection by the diagonal points has been discussed in the preceding contents, and it does not belong to the range of contact of a plurality of vacant units 203. The vacant unit 203A is in surface-to-surface contact with each of the photosensitive pixel unit 202a, the photosensitive pixel unit 202b, and the photosensitive pixel unit 202c. The vacant unit 203A is joined to the photosensitive pixel unit 202d through opposite corners. The vacant unit 203B is in surface-to-surface contact with both the photosensitive pixel unit 202a and the photosensitive pixel unit 202c. Therefore, the optical channels 101 with corresponding inclination directions and angles need to be provided for the light beams carrying the biological information located above the vacant unit 203A and the vacant unit 203B, to achieve a result of receiving them by at least one photosensitive pixel unit 202 around it. The arrangement of discrete distribution of the plurality of vacant units 203 avoids a situation that information loss occurs when a part of the light beams carrying the biological information above a plurality of connected vacant units 203 is received, due to a relatively large area incapable of receiving the light beams carrying the biological information formed by the surface-to-surface contact of the plurality of vacant units 203. Therefore, it is beneficial to improving the accuracy of a biological information recognition result.

Exemplarily, FIG. 3 to FIG. 5 each show a case in which two or three vacant units 203 are provided. It can be seen from FIG. 3 to FIG. 5 that all of these vacant units 203 are discretely distributed among the plurality of photosensitive pixel units 202, in this way, each vacant unit 203 is allowed to be adjacent to as many photosensitive pixel units 202 as possible, then the light beams carrying the biological information above the vacant unit 203 can be received by a plurality of photosensitive pixel units 202 adjacent to this vacant unit, so as to allow the optical sensor 200 to receive more light beams carrying the biological information, obtaining more biological information.

Still taking FIG. 3 as an example, FIG. 3 shows two vacant units 203 and four photosensitive pixel units 202. For the vacant unit 203A, the light beams carrying the biological information located above the vacant unit 203A, after being incident through the inclined optical channels 102, are always received by a part or all of the photosensitive pixel unit 202a, the photosensitive pixel unit 202b, the photosensitive pixel unit 202c, and the photosensitive pixel unit 202d around this vacant unit 203A, so that the light beams carrying the biological information above the vacant unit 203A are not missed. Likewise, the light beams carrying the biological information located above the vacant unit 203B, after being incident through the inclined optical channels 102, are always received by one or both of the photosensitive pixel unit 202a and the photosensitive pixel unit 202c around this vacant unit 203B. Thus, for the vacant unit 203A and the vacant unit 203B shown in FIG. 3, since the two vacant units 203 are discretely distributed among the plurality of photosensitive pixel units 202, as long as the light beams carrying the biological information are located above the vacant unit 203, they can be received by a part or all of the photosensitive pixel units 202 adjacent thereto, thereby avoiding missing of the light beams carrying the biological information.

In an optional implementation of the embodiments of the present disclosure, a shape of the vacant unit 203 may be the same as that of the photosensitive pixel unit 202; and/or, an area of the vacant unit 203 may be the same as that of the photosensitive pixel unit 202.

Figure 7:
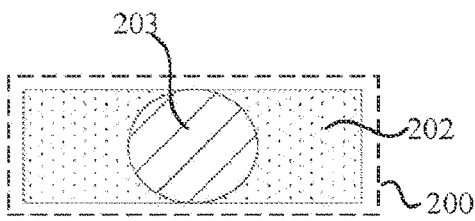
FIG. 7 is a fifth structural schematic diagram of an optical sensor in a biological information recognition module provided in embodiments of the present disclosure.

The vacant unit(s) 203 and the photosensitive pixel units 202 may be distributed and provided in the photosensitive region of the optical sensor 200. For the sake of sufficient utilization and compact design of the photosensitive region, the vacant unit(s) 203 and the photosensitive pixel units 202 each may be provided in the same shape. As shown in various drawings of the solutions of the present disclosure, the vacant units 203 and the photosensitive pixel units 202 each may be presented in a square shape. For another example, the vacant unit(s) 203 and the photosensitive pixel units 202 may be provided to have same area. For ease of understanding, with reference to what is shown in FIG. 7, one vacant unit 203 and two photosensitive pixel units 202 are included in FIG. 7, wherein the vacant unit 203 may be provided in an oval shape, and the photosensitive pixel units 202 each in turn may be provided in an irregular shape having an arc matched with and contacting the oval shape. The area of the oval-shaped vacant unit 203 and the area of each photosensitive pixel unit 202 in an irregular shape may be set to be equal. In this way, even if the photosensitive pixel units 202 and the vacant unit(s) 203 are in different shapes, the light beams carrying the biological information above the vacant unit(s) 203 still can be incident to other photosensitive pixel units 202 through the arrangement of the optical channels 101.

It should be understood that FIG. 7 only shows a case of an example in which each vacant unit 203 and each photosensitive pixel unit 202 have the same area, but it is not an only limitation or an only supportable solution for the fact that each vacant unit 203 and each photosensitive pixel unit 202 have the same area. In an optional implementation further included, each vacant unit 203 and each photosensitive pixel unit 202 are in the same shape and have the same area, for example, any one of FIG. 1 and FIG. 3 to FIG. 6 is an example in which each vacant unit 203 and each photosensitive pixel unit 202 are in the same shape and have the same area.

In an optional implementation of the embodiments of the present disclosure, since the photosensitive pixel units 202 function to receive the light beams carrying the biological information above the vacant unit 203 while receiving the light beams carrying the biological information from above themselves, in the optical sensor 200, the number of the vacant units 203 may be smaller than that of the photosensitive pixel units 202.

Imagining that if the number of the vacant units 203 is greater than that of the photosensitive pixel units 202, the photosensitive pixel units 202, after receiving the light beams carrying the biological information above themselves, further need to receive the light beams carrying the biological information above more than one vacant unit 203. When receiving demand of the light beams exceeds the maximum receiving capability of the photosensitive pixel units 202, it may result in that a part of the light beams carrying the biological information above the vacant units 203 possibly cannot be received by the photosensitive pixel units 202, thereby directly causing loss of this part of the light beams carrying the biological information. Therefore, the number of the vacant units 203 should be smaller than that of the photosensitive pixel units 202, so as to ensure that the light beams carrying the biological information above each vacant unit 203 can be received by the photosensitive pixel units 202.

In an optional implementation of the embodiments of the present disclosure, a plurality of photosensitive pixel units 202 and at least one vacant unit 203 may form one photosensitive pixel unit group 201. The optical channels 101 corresponding to at least a part of the photosensitive pixel units 202 in one photosensitive pixel unit group 201 may be inclined optical channels 102.

A plurality of photosensitive pixel units 202 and at least one vacant unit 203 may form one photosensitive pixel unit group 201, and a plurality of such photosensitive pixel unit groups 201 may be obtained by dividing on the optical sensor 200. For example, as shown in FIG. 8, two vacant units 203A and 203B joined by points and seven photosensitive pixel units 202 around them form a 3*3 photosensitive pixel unit group 201 in FIG. 8. With further combination with FIG. 9, it can be seen that the photosensitive region of the optical sensor 200 is formed by regularly arranging a plurality of 3*3 photosensitive pixel unit groups 201 as in FIG. 8.

Figure 9:
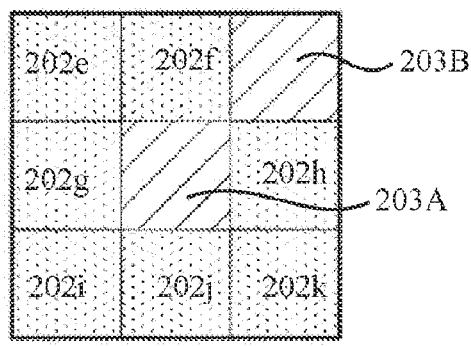
FIG. 9 is a structural schematic diagram of a photosensitive pixel unit group in FIG. 8.
Figure 10:
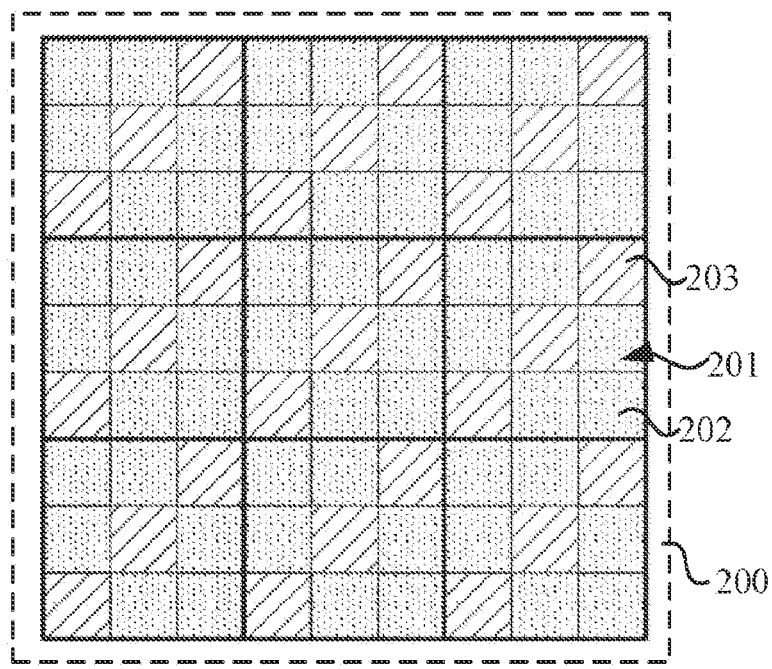
FIG. 10 is a seventh structural schematic diagram of an optical sensor in a biological information recognition module provided in embodiments of the present disclosure.
Figure 11:
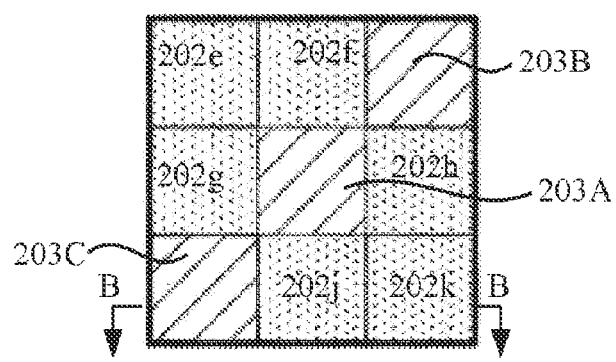
FIG. 11 is a structural schematic diagram of a photosensitive pixel unit group in FIG. 10.

Exemplarily, the photosensitive pixel units 202 and the vacant units 203 in the photosensitive pixel unit group 201 are arranged and provided according to the number and mode as shown in FIG. 9, and a plurality of photosensitive pixel unit groups 201 form the state as shown in FIG. 8. For another example, the photosensitive pixel units 202 and the vacant units 203 in the photosensitive pixel unit group 201 are arranged and provided according to the number and mode as shown in FIG. 11, that is, in the 3*3 photosensitive pixel unit group 201, three units located on a diagonal line are the vacant units 203A, 203B, and 203C, and the others are six photosensitive pixel units 202. As shown in FIG. 10, a plurality of the photosensitive pixel unit groups as shown in FIG. 11 may form one arrangement form of the photosensitive pixel unit groups 201 in FIG. 10. That is, nine photosensitive pixel unit groups 201 as shown in FIG. 11 are included in FIG. 10.

For another example, the vacant units 203 and the photosensitive pixel units 202 also may be arranged in other form as shown in FIG. 13, which is not redundantly described herein.

In an optional implementation of the embodiments of the present disclosure, the number of the vacant units 203 and the number of the photosensitive pixel units 202 in each photosensitive pixel unit group 201 on the optical sensor 200 may be the same, and arrangement rule of the vacant unit(s) 203 and the photosensitive pixel units 202 in each photosensitive pixel unit group 201 may be the same.

Figure 12:
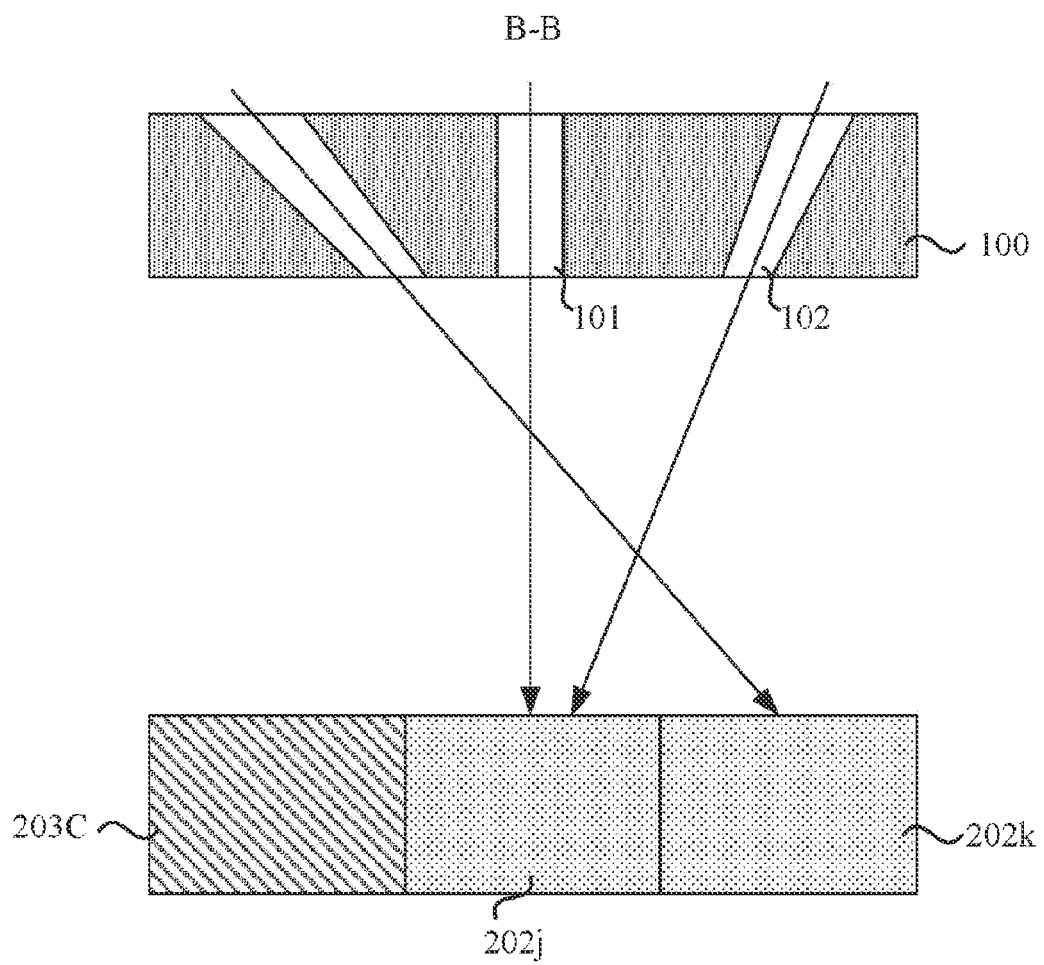
FIG. 12 is a sectional view along B-B in FIG. 11.

Taking FIG. 11 as an example, in one photosensitive pixel unit group 201, the optical channels 101 corresponding to at least a part of the photosensitive pixel units 202 may be inclined optical channels 102. FIG. 12 is obtained by cutting the photosensitive pixel unit group 201 shown in FIG. 11 along a B-B direction of the vacant unit 203C, the photosensitive pixel unit 202j and the photosensitive pixel unit 202k. As shown in FIG. 12, the optical channel 101 corresponding to the photosensitive pixel unit 202j located at the center may be a vertical optical channel 101, the light beams carrying the biological information passing through this optical channel 101 are incident to the corresponding photosensitive pixel unit 202j, while the light channels corresponding to the vacant unit 203C and the photosensitive pixel unit 202k located at two sides of the photosensitive pixel unit 202j respectively are the inclined optical channels 102. In this way, the optical channels 101 in the same photosensitive pixel unit group 201 can be more concentrated and compact, to minimize the optical loss of the optical channels 101 during the transmission of the light beams carrying the biological information. The effect and function of the optical channels 101 have been described in detail in the preceding contents, and are not redundantly described herein again.

In an optional implementation of the embodiments of the present disclosure, the optical channel 101 corresponding to at least one photosensitive pixel unit 202 which is centrally symmetrical to the vacant unit 203 within the photosensitive pixel unit group 201 may be the inclined optical channel 102.

As shown in FIG. 11 and FIG. 12, the photosensitive pixel unit 202k is centrally symmetrical to the vacant unit 203C, and it can be visually seen in FIG. 12 that the optical channel 101 corresponding to the photosensitive pixel unit 202k is the inclined optical channel 102. Certainly, it should be understood that, in diagrams from other viewing angles, as can be seen, the optical channel 101 corresponding to the photosensitive pixel unit 202e which is centrally symmetrical to the vacant unit 203C should also be the inclined optical channel. If the photosensitive pixel unit group is the photosensitive pixel unit group 201 including only two vacant units 203 as shown in FIG. 9, it further includes the photosensitive pixel unit 202j centrally symmetrical to the vacant unit 203A, and the optical channel 101 corresponding to the photosensitive pixel unit 202j is also the inclined optical channel.

It should be noted that, being centrally symmetrical to the vacant unit 203 herein includes being symmetrical with respect to a geometric center of the whole photosensitive pixel unit group 201, and also includes being symmetrical with respect to each central line within the photosensitive pixel unit group 201. Certainly, in the following description, if it is defined that the vacant unit 203 is at the center of the photosensitive pixel unit group 201, this center should refer to the geometric center of the whole photosensitive pixel unit group 201, and an array form of the photosensitive pixel unit group 201 should meet a condition that the vacant unit 203 may be provided at the geometric center, for example, the photosensitive pixel unit group 201 may be set as a combination of an odd number of rows and an odd number of columns.

In an optional implementation of the embodiments of the present disclosure, the center of the photosensitive pixel unit group 201 may be the vacant unit 203.

Figure 15:
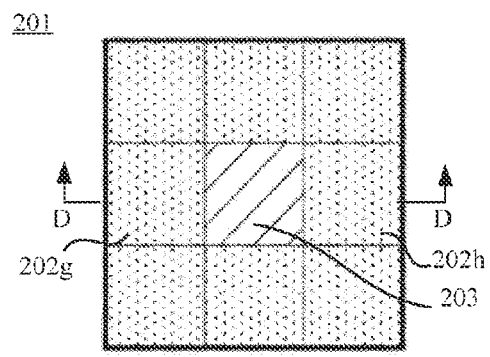
FIG. 15 is a structural schematic diagram of a photosensitive pixel unit group in FIG. 13.

FIG. 15 shows a 3*3 photosensitive pixel unit group 201. In the photosensitive pixel unit group 201, there is one vacant unit 203 located at the center of the photosensitive pixel unit group 201. The photosensitive pixel unit 202g and the photosensitive pixel unit 202h are symmetrical to each other, with the vacant unit 203 as a center, in the sectional view in a D-D direction as shown in FIG. 16, and the optical channels 101 respectively corresponding to the photosensitive pixel unit 202g and the photosensitive pixel unit 202h both may be inclined optical channels 102.

As shown in FIG. 9, FIG. 11 or FIG. 15, the center of each photosensitive pixel unit group 201 is the vacant unit 203, while a difference lies in that in FIG. 15, all that around the vacant unit 203 located at the center may be the photosensitive pixel units 202; in addition to the vacant unit 203A located at the center, the photosensitive pixel unit group 201 in FIG. 9 further may include the vacant unit 203B located at an upper right corner; and in addition to the vacant unit 203A located at the center, the photosensitive pixel unit group 201 in FIG. 11 further may include the vacant unit 203B located at an upper right corner and the vacant unit 203C located at a lower left corner.

Figure 16:
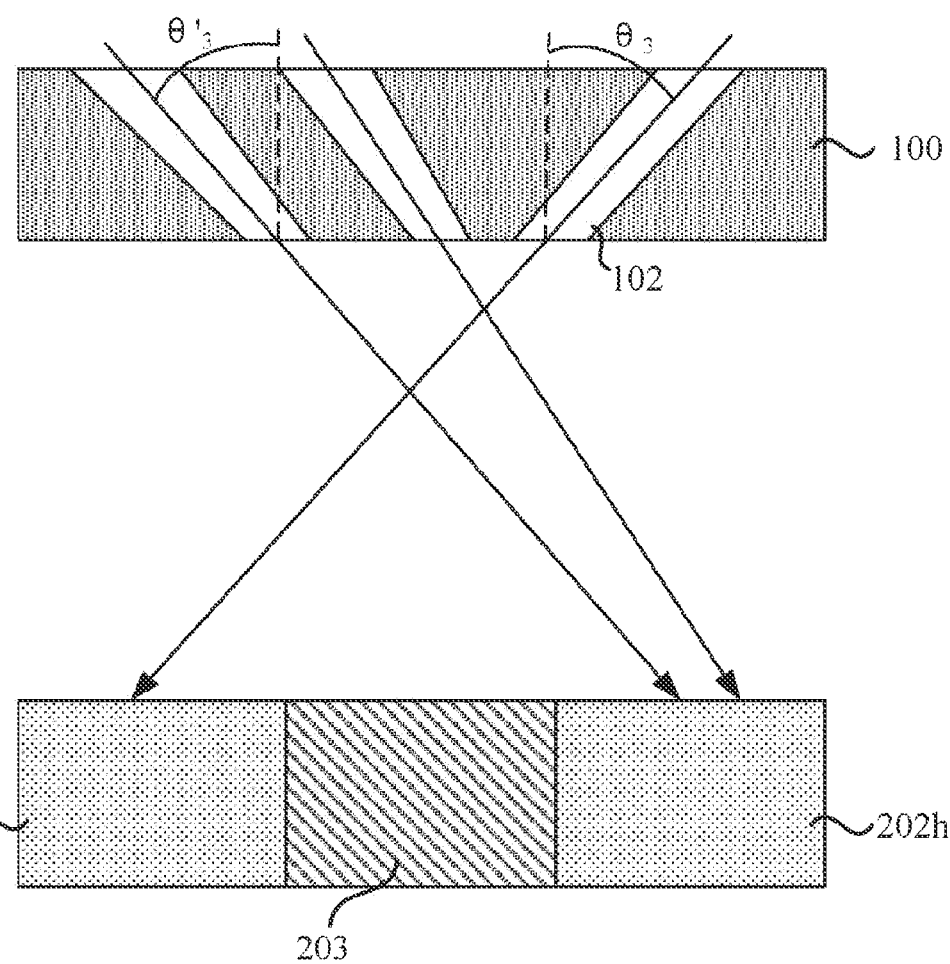
FIG. 16 is a sectional view along D-D in FIG. 15.

In combination with FIG. 16, the optical channels 101 corresponding to at least two photosensitive pixel units 202 which are symmetrical with the vacant unit 203 as a center may intersect above the center.

Taking one photosensitive pixel unit group 201 in FIG. 15 as an example, in the photosensitive pixel unit group 201, the photosensitive pixel unit 202g and the photosensitive pixel unit 202h are symmetrical, with the vacant unit 203 as a center, in a D-D sectional direction as shown in FIG. 16, and the inclined optical channels 102 respectively corresponding to the photosensitive pixel unit 202g and the photosensitive pixel unit 202h may intersect above the center.

Still taking FIG. 16 as an example, the light beams carrying the biological information above the vacant unit 203 may be incident to the photosensitive pixel unit 202h adjacent to the vacant unit 203 through the inclined optical channel 102, so that the light beams are received by the photosensitive pixel unit 202h adjacent to the vacant unit 203.

For another example, as shown in FIG. 9, the photosensitive pixel unit group 201 may include two vacant units 203, which are the vacant unit 203A and the vacant unit 203B respectively, and the photosensitive pixel unit 202f and the photosensitive pixel unit 202h may be provided between the vacant unit 203A and the vacant unit 203B, so that the vacant unit 203A and the vacant unit 203B are joined by connection points.

Referring to FIG. 9, the photosensitive pixel unit group 201 includes the vacant unit 203A and the vacant unit 203B, and the vacant unit 203A and the vacant unit 203B are only joined by the connection points. The photosensitive pixel unit 202f and the photosensitive pixel unit 202h are provided between the vacant unit 203A and the vacant unit 203B, that is, what is adjacent to each vacant unit 203 through a side surface is the photosensitive pixel unit 202, and the vacant unit 203A is adjacent to four photosensitive pixel units 202 through side surfaces, which are the photosensitive pixel unit 202f, the photosensitive pixel unit 202g, the photosensitive pixel unit 202j, and the photosensitive pixel unit 202h, respectively; and is also joined to three photosensitive pixel units 202 through opposite corners thereof, which are the photosensitive pixel unit 202e, the photosensitive pixel unit 202i, and the photosensitive pixel unit 202k, respectively. The vacant unit 203B is adjacent to two photosensitive pixel units 202 through side surfaces thereof, which are the photosensitive pixel unit 202f and the photosensitive pixel unit 202h, respectively.

For another example, referring to FIG. 11 again, the photosensitive pixel unit group 201 may include three vacant units, i.e., the vacant unit 203A, the vacant unit 203B, and the vacant unit 203C. The vacant unit 203A, the vacant unit 203B, and the vacant unit 203C may be only joined by connection points. The photosensitive pixel units may be provided between the vacant unit 203A, the vacant unit 203B, and the vacant unit 203C. All that are adjacent to each vacant unit 203 through side surfaces may be the photosensitive pixel units 202. The vacant unit 203A may be adjacent to four photosensitive pixel units 202 through side surfaces thereof, which are the photosensitive pixel unit 202f, the photosensitive pixel unit 202g, the photosensitive pixel unit 202j, and the photosensitive pixel unit 202h, respectively; and further may be joined to two photosensitive pixel units 202 through opposite corners thereof, which are the photosensitive pixel unit 202e and the photosensitive pixel unit 202k, respectively. The vacant unit 203B may be adjacent to two photosensitive pixel units 202 through side surfaces thereof, which are the photosensitive pixel unit 202f and the photosensitive pixel unit 202h, respectively. The vacant unit 203C may be adjacent to the photosensitive pixel unit 202 through side surfaces thereof, which are the photosensitive pixel unit 202g and the photosensitive pixel unit 202j. In this way, a plurality of vacant units 203 in one photosensitive pixel unit group 201 may be separated by a plurality of photosensitive pixel units 202, so that the plurality of vacant units 203 are discretely distributed among the plurality of photosensitive pixel units 202, and the light beams carrying the biological information above any vacant unit 203 can be received by the photosensitive pixel unit 202 adjacent thereto, thus effectively avoiding loss of the light beams carrying the biological information during the transmission.

Figure 14:
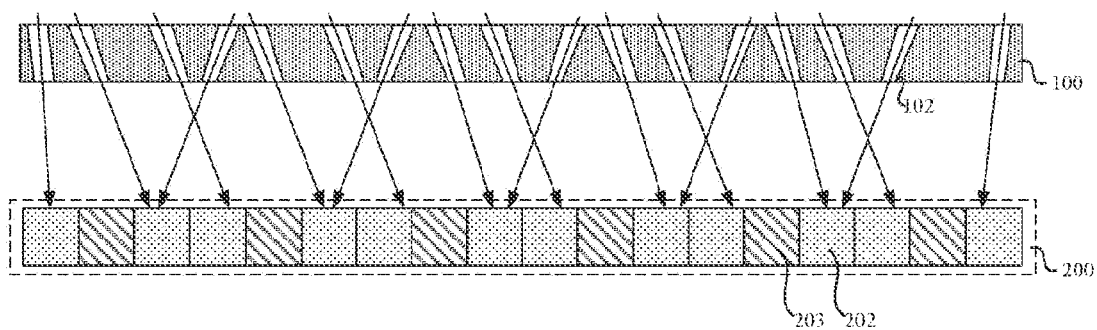
FIG. 14 is a sectional view along C-C in FIG. 13.

In an implementation of the embodiments of the present disclosure, as shown in FIG. 14, the light beams carrying the biological information above each vacant unit 203 may be incident to at least one photosensitive pixel unit 202 adjacent to the vacant unit 203 through the inclined optical channels 102.

The inclined optical channels 102 may be corresponding to the photosensitive pixel units 202, and the light beams carrying the biological information above each vacant unit 203, after being incident through the inclined optical channels 102, are received by at least one photosensitive pixel unit 202 adjacent to the vacant unit 203.

Exemplarily, reference also can be made to what is shown in FIG. 16. The vacant unit 203 may be located at the center, two photosensitive pixel units 202 adjacent to the vacant unit 203 are the photosensitive pixel unit 202g and the photosensitive pixel unit 202h respectively, and the light beams carrying the biological information above the vacant unit 203 may be received by the photosensitive pixel unit 202h adjacent to the vacant unit 203 through the inclined optical channel 102.

In an implementation of the embodiments of the present disclosure, within the photosensitive pixel unit group 201, there may be a plurality of photosensitive pixel units 202 equally spaced from the vacant unit 203. All of the degrees of the included angles θ of the optical channels 101 corresponding to the plurality of photosensitive pixel units 202 equally spaced from the vacant unit 203 may be the same.

As shown in FIG. 16, taking the vacant unit 203 as a center, the photosensitive pixel unit 202g and the photosensitive pixel unit 202h are equally spaced from the vacant unit 203, and the optical channels 101 respectively corresponding to the photosensitive pixel unit 202g and the photosensitive pixel unit 202h are the inclined optical channels 102. FIG. 16 shows that an included angle $\theta_3$ of the inclined optical channel 102 corresponding to the photosensitive pixel unit 202g is equal to an included angle $\theta'_3$ of the inclined optical channel 102 corresponding to the photosensitive pixel unit 202h.

Figure 17:
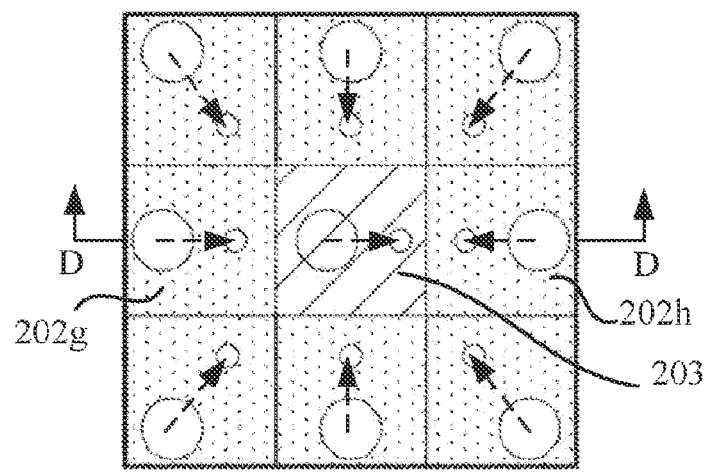
FIG. 17 is a first structural schematic diagram of another embodiment in FIG. 15.

It should be noted that, reference also may be made to FIG. 17 for transmission directions of the light beams carrying the biological information in the optical channels 101 within the photosensitive pixel unit group 201. Dashed lines with arrows shown in FIG. 17 indicate the transmission directions of the light beams passing through the optical channels 101. The light beams may start from near a reader when viewing the figure, and penetrate in directions towards the paper surface, with the arrows showing directions of the light beams, that is, the light beams of one photosensitive pixel unit 202 exit obliquely in a direction towards the center. When the inclination angle is large enough, the light beams carrying the biological information above the photosensitive pixel unit 202g are inclined to an opposite side, and can pass above the vacant unit 203 and be received by the photosensitive pixel unit 202h.

In the above, for ease of description and understanding, in FIG. 17, at least two shading layers are exemplarily provided above the optical sensor 200, each of the shading layers and the pixel units of the optical sensor 200 may be provided thereon with light-transmitting holes, a connecting line of the light-transmitting holes of the two shading layers corresponding to the same pixel unit forms at least a part of the optical channel 101, and inclination of the optical channel 101 is realized through position deviation of the light-transmitting holes of the two shading layers corresponding to the same pixel unit. In FIG. 17, circular holes with a larger diameter may represent corresponding light-transmitting holes on the shading layer away from the optical sensor 200, and circular holes with a smaller diameter may represent corresponding light-transmitting holes on the shading layer close to the optical sensor 200. Directions of the arrows may represent the transmission directions of the light beams carrying the biological information in the optical channels 101.

Figure 18:
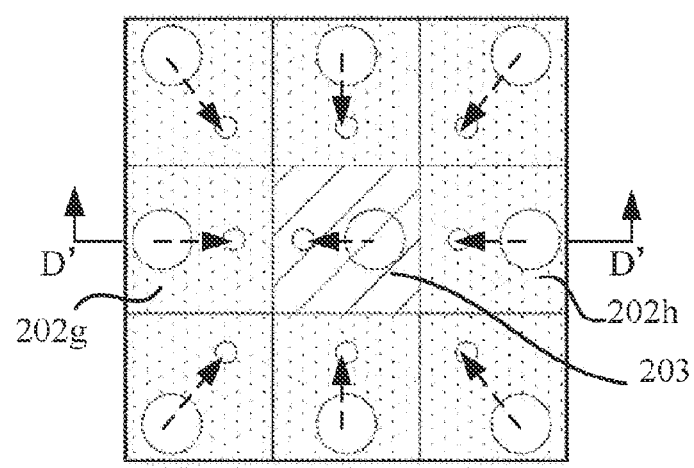
FIG. 18 is a second structural schematic diagram of another embodiment in FIG. 15.
Figure 19:
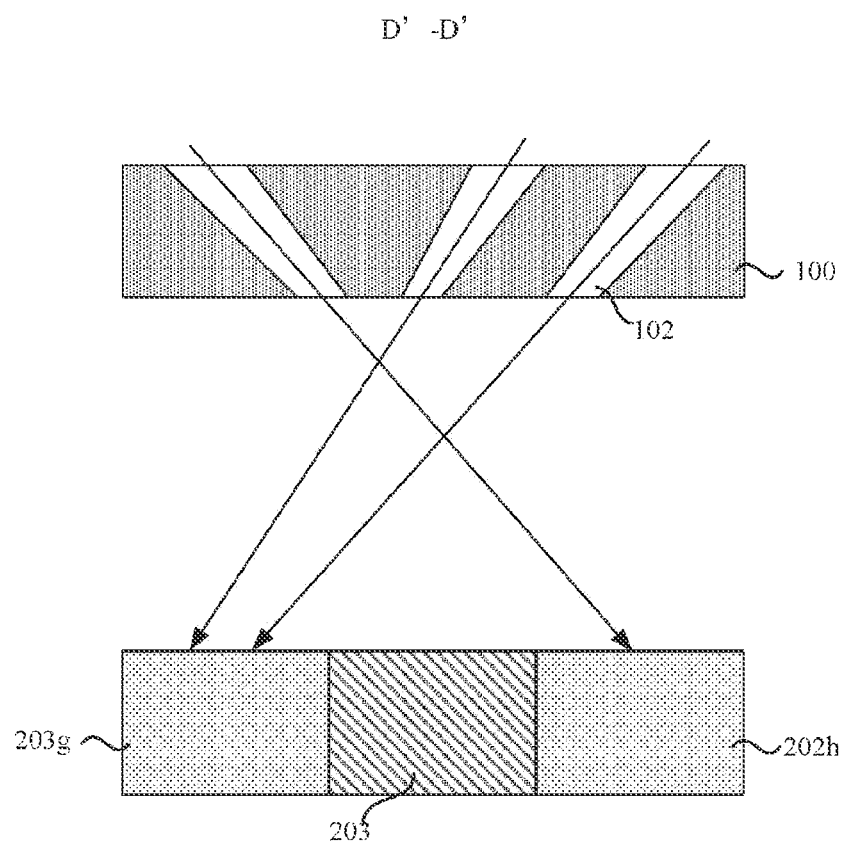
FIG. 19 is a sectional view along D'-D' in FIG. 18.

Corresponding light beams carrying the biological information above the vacant unit 203 within the photosensitive pixel unit group 201 are transmitted into the photosensitive pixel unit 202 adjacent to the vacant unit 203. Corresponding light beams carrying the biological information above the vacant unit 203 shown in FIG. 17 are transmitted to the photosensitive pixel unit 202h adjacent thereto on the right, and reference may be made to an optical path schematically shown in FIG. 16 for the transmission direction in space. The corresponding light beams carrying the biological information above the vacant unit 203 also may be transmitted to the photosensitive pixel unit 202g on the left of the vacant unit, as shown in FIG. 18, and this transmission mode forms an optical path transmission schematically shown in FIG. 19. In addition, the corresponding optical channels 101 above the vacant unit 203 also may be inclined towards six other photosensitive pixel units 202 around it. When there are a plurality of inclined optical channels 102 with different light guiding directions above the vacant unit 203, the light beams carrying the biological information transmitted above the vacant unit 203 are respectively received by one or more of the plurality of photosensitive pixel units 202.

In one implementation of the embodiments of the present disclosure, the plurality of photosensitive pixel units 202 and the vacant units 203 forming the photosensitive pixel unit group 201 may be arranged and combined in an M*N form, where M is an integer greater than or equal to 1, and N is an integer greater than or equal to 2.

Exemplarily, seven photosensitive pixel units 202 and two vacant units 203 shown in FIG. 9 may form one photosensitive pixel unit group 201, and this photosensitive pixel unit group 201 is present in a 3*3 permutation. The six photosensitive pixel units 202 and the three vacant units 203 in FIG. 11 may form one photosensitive pixel unit group 201, and this photosensitive pixel unit group 201 is presented in another 3*3 permutation.

In the above, N is an integer greater than or equal to 2, and M is an integer greater than or equal to 1, that is, in the row-column arrangement of M and N, the pixel units in at least one direction are arranged with two cells, that is to say, M and N cannot be simultaneously 1, and the photosensitive pixel unit group 201 in the embodiments of the present disclosure does not include a 1*1 form, that is, not including the photosensitive pixel unit group 201 having only one pixel unit.

N and M may be equal values, such as 3*3 exemplified above, and certainly, N and M may be unequal. When N and M are unequal, referring to FIG. 3 to FIG. 5, as shown in FIG. 3, it may be regarded as one photosensitive pixel unit group 201, and in this photosensitive pixel unit group 201, the vacant units 203 and the photosensitive pixel units 202 are presented in a 2*3 combination form. Referring again to FIG. 7, FIG. 7 may be regarded as one photosensitive pixel unit group 201, in which the vacant unit 203 and the photosensitive pixel units 202 are presented in a 1*3 combination form. Besides, the photosensitive pixel unit group 201 also may be presented in different combination forms such as 2*5 and 8*10, which are not enumerated in the present disclosure.

It should be noted that, it has been defined in detail in the preceding description that, on the optical sensor 200, the number of the vacant units 203 is less than that of the photosensitive pixel units 202, and for the photosensitive pixel unit groups 201, the number of the vacant units 203 in one photosensitive pixel unit group 201 generally should not be greater than that of the photosensitive pixel units 202. For example, for one 3*3 photosensitive pixel unit group 201, there are in total nine pixel units therein, and at most four of the pixel units are used as vacant units 203, for example, the 3*3 photosensitive pixel unit group 201 may be presented in a combination form of four vacant units 203 and five photosensitive pixel units 202. For another example, for one 2*3 photosensitive pixel unit group 201, as shown in FIG. 5, there are in total six pixel units therein, and then at most three of the pixel units are used as vacant units 203.

The above description is made from the number of the pixel units forming the photosensitive pixel unit group 201, as well as the number of the vacant units 203 and the number of the photosensitive pixel units 202 in the photosensitive pixel unit group 201. In an implementation of the embodiments of the present disclosure, understanding and definition further may be made from the dimension of the area of the photosensitive pixel unit group 201, wherein a total area of the plurality of the photosensitive pixel units 202 in the photosensitive pixel unit group 201 may be larger than or equal to a total area of the vacant units 203.

In one photosensitive pixel unit group 201, the total area of all photosensitive pixel units 202 is greater than or equal to the total area of all the vacant units 203, in this way, it can be ensured to the greatest extent that the light beams carrying the biological information above the vacant units 203 are all received by the photosensitive pixel units 202 within the group, thereby reducing loss of the light beams during the transmission. It also may be understood that, for the optical sensor 200 formed by a plurality of photosensitive pixel unit groups 201, the total area of all the photosensitive pixel units 202 also may be larger than or equal to the total area of all the vacant units 203.

Corresponding to that the number of the vacant units 203 in one photosensitive pixel unit group 201 cannot be greater than half of the total number of the cells in the photosensitive pixel unit group 201, the total area of all the vacant units 203 in the photosensitive pixel unit group 201 cannot be greater than half of the total area of all the photosensitive pixel units 202, the purpose of which is also to avoid the loss of the light beams carrying the biological information above the vacant units 203.

In the biological information recognition module according to the embodiments of the present disclosure, the vacant unit 203 is provided among a plurality of photosensitive pixel units 202 of the optical sensor 200, the vacant unit 203 does not have to receive the light beams above, while the light beams above may be received by other photosensitive pixel units 202, therefore, another corresponding structure may be provided at the position where the vacant unit 203 is located so as to realize another function of the optical sensor 200. When another functional structure is provided on the vacant unit 203, it may be understood as that a region for providing this structure that needs to be additionally provided on the optical sensor 200 can be removed, thus, the whole optical sensor 200 has a compact structure. From another perspective, a space saved by removing the another region on the optical sensor 200 may be used to enlarge the photosensitive region, that is, providing a larger region for arranging the photosensitive pixel units 202, which effectively enlarges the area of the photosensitive region of the optical sensor 200 without increasing the size of the optical sensor 200, reduces the cost of the module, maximizes the utilization rate of structural size of the biological information recognition module as much as possible, and saves more internal space for the electronic device adopting the biological information recognition module in the embodiments of the present disclosure.

In an implementation of the embodiments of the present disclosure, the vacant unit 203 may include a first reserved area for arranging circuit signal lines, and electrical signals are collected through the circuit signal lines arranged in the first reserved area, in this way, there is no need to provide on the optical sensor 200 a wiring region outside the original photosensitive region, thereby saving the structural size of the optical sensor 200.

In an implementation of the embodiments of the present disclosure, the vacant unit 203 further may include a second reserved area for providing circuit elements, that is, the circuit elements are arranged in the vacant unit 203, so as to realize corresponding functions of the circuit elements.

By arranging the circuit signal lines and the circuit elements in the vacant units 203, as in the biological information recognition module of the embodiments of the present disclosure, the vacant units 203 on the optical sensor 200 are generally discretely distributed. After the circuit signal lines and/or the circuit elements are arranged in the vacant units 203, it facilitates electrical connection between the circuit signal lines and the circuit elements in various vacant units 203. In an implementation of the embodiments of the present disclosure, the circuit signal lines and/or the circuit elements in the plurality of discrete vacant units 203 may be electrically connected by other electrically conductive layers through via holes.

Exemplarily, an insulation layer and an electrically conductive layer may be further provided in sequence on a back side of the optical sensor 200, via holes are provided running through the optical sensor 200 and the insulation layer and communicating with the electrically conductive layer, and two vacant units 203 spaced apart from each other may communicate with the electrically conductive layer through the via holes. In this way, the electrical connection between the circuit signal lines and the circuit elements may be realized, through the via holes, between two vacant units 203 spaced from each other, thereby realizing circuit connection.

Figure 20:
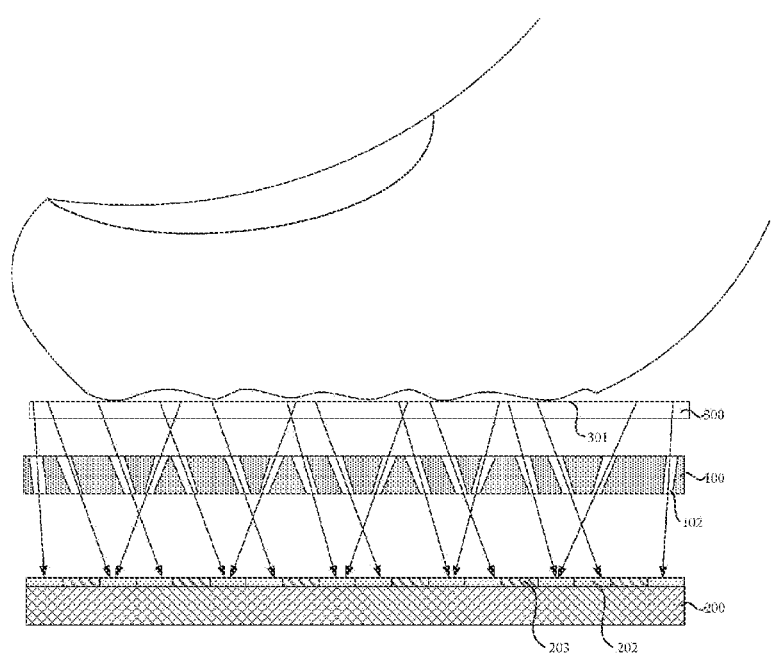
FIG. 20 is a structural schematic diagram of an electronic device provided in embodiments of the present disclosure.

In another aspect of the embodiments of the present disclosure, an electronic device is provided. Referring to FIG. 20, the electronic device may include a display screen 300, and the biological information recognition module according to any one of the preceding arranged under the display screen 300.

The electronic device may be a common terminal device, for example, a handheld display device such as a mobile phone or a tablet computer, or a household liquid crystal display appliance such as a television set, a desktop computer, an air conditioner, or a refrigerator. In addition, the biological information recognition module may be configured to recognize the light beams carrying the biological information. For example, the light beams carrying the biological information may be palm prints, palm veins, joint lines, iris, and human face of human body. By way of example and not limitation, the biological information may be fingerprints from a human finger. For ease of understanding, the fingerprint recognition on the handheld display devices which is relatively common in real life is taken as an example for illustration.

As shown in FIG. 20, a biological information recognition region 301 may be provided on the display screen 300, the biological information recognition region 41 may be a fingerprint recognition region, and the biological information recognition region 301 may be corresponding to the photosensitive region of the optical sensor 200, wherein light beams from the biological information recognition region 301 above the vacant units 203 may be received by the corresponding photosensitive pixel units 202.

In specific operations, a user may fit a carrier, such as a finger or a palm, possessing individual biological characteristics, in the biological information recognition region 301 of the display screen 300. Taking under-display fingerprint recognition as an example, the light beams irradiating fingerprint lines and reflected can carry line characteristics at an irradiated finger position as fingerprint information. The light beams carrying the fingerprint information, after passing through the optical channels 101 of the optical path guide layer 100 in the biological information recognition module, are incident to the optical sensor 200, and received by the photosensitive pixel units 202 of the optical sensor 200, for recognizing user information. In the present disclosure, through the light beams carrying the biological information above the vacant units 203, the light beams carrying the biological information in a wider region range may be made to enter the optical sensor 200, so that the electronic device receives more optical signals reflected by the fingerprints, so as to obtain more fingerprint information, which can effectively increase a pixel collection range of the optical sensor 200 without increasing the area of the biological information recognition region 301 of the display screen 300, improve the recognition accuracy of biological information recognition, and meanwhile can reduce manufacturing cost of the electronic device, reduce a volume of the module, and save more internal space for the electronic device.

In addition to integrating the biological information recognition module under the display screen 300, the biological information recognition module further may be applied to other feasible scenarios. For example, the biological information recognition module may be arranged under a transparent protection glass plate or protection film layer, so that the light beams carrying the biological information are incident to the biological information recognition module through the protection glass plate, to be recognized by the biological information recognition module. This process has been described in any of the preceding embodiments, and is not redundantly described again herein.

The above are merely embodiments of the present disclosure and are not intended to limit the scope of protection of the present disclosure. For those skilled in the art, various modifications and changes could be made to the present disclosure. Any modifications, equivalent substitutions, improvements and so on made within the spirit and principle of the present disclosure should be covered within the scope of protection of the present disclosure.

INDUSTRIAL APPLICABILITY

The present disclosure discloses a biological information recognition module and an electronic device, relating to the technical field of electronic devices. The biological information recognition module includes an optical path guide layer and an optical sensor. The optical path guide layer includes a plurality of optical channels. The optical sensor includes a plurality of photosensitive pixel units and at least one vacant unit provided among the plurality of photosensitive pixel units. Light beams carrying biological information above the vacant unit are received by at least one photosensitive pixel unit via the optical channels. The electronic device includes a display screen and the biological information recognition module arranged under the display screen. The biological information recognition module and the electronic device can receive the light beams carrying the biological information within a larger region area, without increasing the overall volume of the module.

In addition, it can be understood that the biological information recognition module and the electronic device in the present disclosure are reproducible, and can be applied in various industrial applications. For example, the biological information recognition module and the electronic device may be applied to the field of electronic devices.

What is claimed is:

1. A biological information recognition module, wherein the biological information recognition module comprises an optical path guide layer and an optical sensor; the optical path guide layer comprises a plurality of optical channels, and the optical sensor comprises a plurality of photosensitive pixel units and at least one vacant unit provided among the plurality of photosensitive pixel units, wherein light beams carrying biological information above the at least one vacant unit are received by the photosensitive pixel units via the optical channels; wherein number of the at least one vacant unit is smaller than number of the photosensitive pixel units.

2. The biological information recognition module according to claim 1, wherein the optical channels comprise inclined optical channels, and the inclined optical channels have included angles with a straight line perpendicular to a surface of the optical sensor; and the light beams carrying the biological information above the at least one vacant unit are received by the photosensitive pixel units via the inclined optical channels.

3. The biological information recognition module according to claim 1, wherein the optical sensor comprises a plurality of the vacant units, and the plurality of the vacant units are discretely distributed among the plurality of photosensitive pixel units.

4. The biological information recognition module according to claim 1, wherein a shape of each of the at least one vacant unit is same as a shape of each of the photosensitive pixel units; and/or, an area of each of the at least one vacant unit is same as an area of each of the photosensitive pixel units.

5. The biological information recognition module according to claim 2, wherein the plurality of photosensitive pixel units and the at least one vacant unit form a photosensitive pixel unit group; and the optical channels corresponding to at least a part of the photosensitive pixel units in the photosensitive pixel unit group are the inclined optical channels.

6. The biological information recognition module according to claim 5, wherein number of the at least one vacant unit and number of the photosensitive pixel units in each photosensitive pixel unit group on the optical sensor are same, and arrangement rules of the at least one vacant unit and the photosensitive pixel units in each photosensitive pixel unit group are same.

7. The biological information recognition module according to claim 5, wherein the optical channel corresponding to at least one of the photosensitive pixel units which is centrally symmetrical to each of the at least one vacant unit within the photosensitive pixel unit group are the inclined optical channels.

8. The biological information recognition module according to claim 5, wherein a center of the photosensitive pixel unit group is the vacant unit.

9. The biological information recognition module according to claim 8, wherein the optical channels corresponding to at least two of the photosensitive pixel units which are symmetrical with the vacant unit as a center intersect above the center.

10. The biological information recognition module according to claim 5, wherein the photosensitive pixel unit group comprises a plurality of vacant units, and the photosensitive pixel units are provided between two of the vacant units.

11. The biological information recognition module according to claim 5, wherein light beams above the vacant unit are incident, through the inclined optical channel, to at least one photosensitive pixel unit adjacent to the vacant unit.

12. The biological information recognition module according to claim 5, wherein within the photosensitive pixel unit group, degrees of the included angles of the optical channels corresponding to the plurality of photosensitive pixel units equally spaced from the vacant unit are same.

13. The biological information recognition module according to claim 5, wherein the plurality of photosensitive pixel units and the at least one vacant unit forming the photosensitive pixel unit group are arranged and combined in an M*N form, wherein M is an integer greater than or equal to 1, and N is an integer greater than or equal to 2.

14. The biological information recognition module according to claim 5, wherein a total area of the plurality of photosensitive pixel units in the photosensitive pixel unit group is greater than or equal to a total area of the at least one vacant unit.

15. The biological information recognition module according to claim 1, wherein the at least one vacant unit each comprises a first reserved area for arranging circuit signal lines.

16. The biological information recognition module according to claim 15, wherein the vacant unit further comprises a second reserved area for providing circuit elements.

17. The biological information recognition module according to claim 16, wherein an insulation layer and an electrically conductive layer are provided in sequence on a back side of the optical sensor, via holes are provided running through the optical sensor and the insulation layer and communicating with the electrically conductive layer, and two vacant units spaced apart from each other communicate with the electrically conductive layer through the via holes.

18. An electronic device, wherein the electronic device comprises a display screen and the biological information recognition module according to claim 1 arranged under the display screen.

19. The electronic device according to claim 18, wherein a biological information recognition region is provided on the display screen, and light beams from the biological information recognition region above the at least one vacant unit are received by corresponding photosensitive pixel units through the optical channels.

* * * * *